United States Patent
Souki et al.

(10) Patent No.: US 9,166,262 B2
(45) Date of Patent: Oct. 20, 2015

(54) BATTERY PACK WITH COOLING PASSAGE

(75) Inventors: Takahiro Souki, Handa (JP); Teruhiko Kameoka, Okazaki (JP); Manabu Yamada, Okazaki (JP); Shinjirou Shimizu, Kariya (JP); Naoya Hata, Kariya (JP); Masaki Itagaki, Kariya (JP); Yoshimitsu Inoue, Chiryu (JP)

(73) Assignee: DENSO CORPORATION, Kariya (JP)

(*) Notice: Subject to any disclaimer, the term of this patent is extended or adjusted under 35 U.S.C. 154(b) by 592 days.

(21) Appl. No.: 13/238,411

(22) Filed: Sep. 21, 2011

(65) Prior Publication Data

US 2012/0070711 A1 Mar. 22, 2012

(30) Foreign Application Priority Data

Sep. 21, 2010 (JP) ................................ 2010-211094

(51) Int. Cl.
| | |
|---|---|
| H01M 2/02 | (2006.01) |
| H01M 10/613 | (2014.01) |
| H01M 10/60 | (2014.01) |
| H01M 6/50 | (2006.01) |
| H01M 10/6566 | (2014.01) |

(52) U.S. Cl.
CPC .......... *H01M 10/613* (2015.04); *H01M 2/0245* (2013.01); *H01M 6/5038* (2013.01); *H01M 10/50* (2013.01); *H01M 10/5004* (2013.01); *H01M 10/6566* (2015.04)

(58) Field of Classification Search
CPC .............. H01M 6/5038; H01M 10/50; H01M 10/5004; H01M 2/0245
USPC ........................................................ 429/120
See application file for complete search history.

(56) References Cited

U.S. PATENT DOCUMENTS

| | | | |
|---|---|---|---|
| 6,033,800 A | 3/2000 | Ichiyanagi et al. | |
| 6,309,776 B1 | 10/2001 | Okajima et al. | |
| 7,195,837 B2 * | 3/2007 | Suzuki et al. | 429/434 |

(Continued)

FOREIGN PATENT DOCUMENTS

| | | |
|---|---|---|
| JP | 2008-159439 | 7/2008 |
| JP | 2008-165989 | 7/2008 |
| JP | 2009-277471 | 11/2009 |

OTHER PUBLICATIONS

Office Action (3 pages) dated Oct. 22, 2013, issued in corresponding Japanese Application No. 2010-211094 and English translation (4 pages).

(Continued)

Primary Examiner — Jonathan G Leong
Assistant Examiner — James Erwin
(74) Attorney, Agent, or Firm — Nixon & Vanderhye P.C.

(57) ABSTRACT

A battery pack includes battery modules each having a battery cell and a battery case housing the battery cell therein. The battery modules are stacked in a stacking direction so that a cooling passage for allowing a cooling medium to flow is defined between opposed surfaces of adjacent battery cases. One of the opposed surfaces has first ribs projecting toward the other of the opposed surfaces and extending parallel to each other along the one. The other of the opposed surfaces has second ribs projecting toward the one of the opposed surfaces and extending parallel to each other along the other. In the cooling passage, the first ribs and the second ribs intersect each other and end portions of the first ribs and end portions of the second ribs are in contact with each other in the stacking direction.

10 Claims, 7 Drawing Sheets

(56) References Cited

U.S. PATENT DOCUMENTS

| | | | |
|---|---|---|---|
| 2002/0142201 A1* | 10/2002 | Nelson | 429/26 |
| 2006/0063067 A1 | 3/2006 | Kim | |
| 2006/0090330 A1* | 5/2006 | Kauranen et al. | 29/623.4 |
| 2006/0115720 A1* | 6/2006 | Kim | 429/156 |
| 2006/0208698 A1 | 9/2006 | Maguire et al. | |
| 2006/0220615 A1 | 10/2006 | Kim | |
| 2006/0246348 A1* | 11/2006 | Hamada et al. | 429/148 |
| 2009/0155680 A1 | 6/2009 | Maguire et al. | |
| 2009/0258286 A1* | 10/2009 | Ho | 429/100 |

OTHER PUBLICATIONS

Office Action (10 pages) dated Oct. 22, 2013, issued in corresponding Chinese Application No. 201110289878.8 and English translation (13 pages).

Chinese Office Action issued for Chinese Patent Application No. 201110289878.8, dated May 23, 2014.

* cited by examiner

BATTERY PACK WITH COOLING PASSAGE

CROSS REFERENCE TO RELATED APPLICATION

This application is based on Japanese Patent Application No. 2010-211094 filed on Sep. 21, 2010, the disclosure of which is incorporated herein by reference.

FIELD OF THE INVENTION

The present invention relates to a battery pack including multiple battery modules with battery cells, more particularly, to a battery pack with a cooling passage between battery modules.

BACKGROUND OF THE INVENTION

An example of a battery pack is described in Japanese Patent Application Publication No. 2009-277471. In the battery pack, multiple battery cells are stacked and electrically connected in series. A battery holder is disposed between the stacked battery cells. End plates are arranged at ends of the stack of battery cells with respect to a stacking direction. The end plates are connected by a binding band. The binding band exerts a binding force to the battery holder in a direction along the stacking direction to fix the stacked battery cells.

Further, an air passage is formed between a surface of the battery cell that is perpendicular to the stacking direction and a surface of the battery holder that is opposed to the surface of the battery cell with respect to the stacking direction. Specifically, the surface of the battery holder has multiple ribs projecting toward the surface of the battery cell. Each of the ribs extends in a horizontal direction, and the ribs are arranged in a vertical direction. Further, an end surface of each rib is in contact with the surface of the battery cell. Thus, multiple air spaces each extending in the horizontal direction are formed in the vertical direction. The air passage is provided by the multiple air spaces. The battery cells are cooled by air flowing in the air passage during its operation.

In such an air passage, since the multiple horizontal air spaces, which are narrow, are arranged in the vertical direction, if the air is unevenly supplied into the air spaces, it is difficult to evenly cool the surface of the battery cell. Further, a boundary layer will be formed in a flow of air between the surface of the battery cell and the surface of the battery holder due to the air spaces being narrow and long. As a result, a heat transfer coefficient between the air and the battery cell will be reduced, degrading cooling performance.

SUMMARY OF THE INVENTION

The present invention is made in view of the foregoing matter, and it is an object of the present invention to provide a battery pack with an enhanced cooling structure.

A battery pack according to an aspect includes a plurality of battery modules each having a battery cell and a battery case housing the battery cell therein. The battery modules are electrically connected to each other and stacked in a stacking direction so that a cooling passage for allowing a cooling medium to flow is defined between opposed surfaces of adjacent battery cases. One of the opposed surfaces has first ribs projecting toward the other of the opposed surfaces and extending parallel to each other along the one of the opposed surfaces. The other of the opposed surfaces has second ribs projecting toward the one of the opposed surfaces and extending parallel to each other along the other of the opposed surfaces. In the cooling passage, the first ribs and the second ribs intersect each other and end portions of the first ribs and end portions of the second ribs are in contact with each other with respect to the stacking direction.

Since the first ribs and the second ribs intersect each other, when the stacked battery modules are viewed along the stacking direction, the cooling passage is formed in a mesh shape due to the intersecting first and second ribs. The cooling passage includes first rib passage portions defined between the adjacent first ribs and second rib passage portions defined between the adjacent second ribs. Further, the first rib passage portions and the second rib passage portions are in communication with each other through intersectional areas where the first rib passage portions and the second rib passage portions intersect each other. With this, the first rib passage portions are in communication with each other through the second rib passage portions. Likewise, the second rib passage portions are in communication with each other through the first rib passage portions. That is, the cooling passage is formed into a continuous mesh-shape.

Therefore, the cooling medium flows in the first rib passage portions and second rib passage portions. In this case, the cooling medium flowing in the first rib passage portion flows into the adjacent first rib passage portion while spreading through the intersectional portions, and the cooling medium flowing in the second rib passage portion flows into the adjacent second rib passage portion while spreading through the intersectional portions.

In this way, the cooling medium flows in a weaving manner. Therefore, the cooling medium can flow while widely spreading over the entirety of the cooling passage. Accordingly, the cell is effectively and evenly cooled.

In addition, because edges of the end portions of the first and second ribs are located in the intersectional areas, a turbulence effect of the cooling medium can be generated. Therefore, boundary layers of the cooling medium are reduced in the cooling passage, and thus a heat transfer coefficient of the cooling medium is improved. Accordingly, the cooling effect of the cell improves.

BRIEF DESCRIPTION OF THE DRAWINGS

Other objects, features and advantages of the present invention will become more apparent from the following detailed description made with reference to the accompanying drawings, in which like parts are designated by like reference numerals and in which.

DETAILED DESCRIPTION OF EXEMPLARY EMBODIMENTS

Exemplary embodiments will be described with reference to the drawings. Like parts are designated with like reference numerals throughout the exemplary embodiments, and a description thereof will not be repeated.

First Embodiment

A first embodiment will be described with reference to FIGS. 1 through 6.

Figure 4:
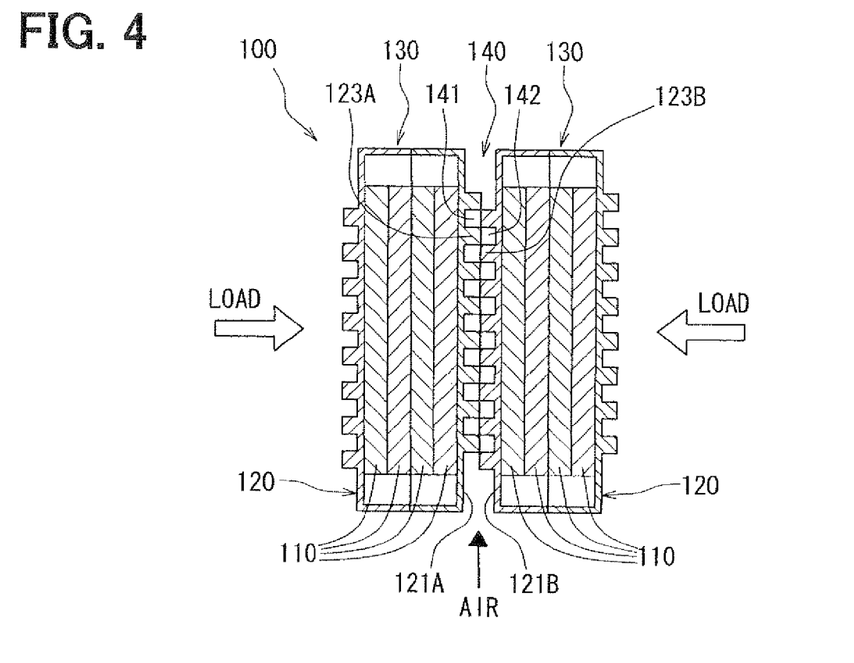
FIG. 4 is a cross-sectional view of the battery pack according to the first embodiment.

A battery pack 100 according to the present embodiment is, for example, used as a battery of a motor for running a hybrid vehicle or an electric vehicle, a storage battery for houses, and the like. Referring to FIG. 4, the battery pack 100 is constructed of a stack of battery modules 130 (e.g., at least two battery modules). Each of the battery modules 130 includes a battery case 120 and a battery cell 110 housed in the battery case 120. The battery modules 130 are electrically connected in series. A cooling passage 140 is formed between adjacent battery modules 130. Hereinafter, a direction in which the battery modules 130 are stacked, such as, a right and left direction in FIG. 4, is referred to as a stacking direction.

The battery cell 110 is a charge-discharge battery having a plate shape (e.g., flat plate shape) with a rectangular outline. The battery cell 110 is, for example, a nickel hydrogen secondary battery, a lithium-ion secondary battery, an organic radical battery, or the like. For example, the battery cell 110 has a rolled-layer structure. The structure has three layers including a positive side metal foil with an active material, a negative side metal foil with an active material and a separator between the positive side metal foil and the negative side metal foil, and the three layers are rolled and formed into a flat shape. The roller-layer structure is housed in a metal case, a laminate film, or the like. To ensure a predetermined battery property in the battery cell 110, it is necessary to keep thickness of the layers with even thickness throughout in a direction along an axis of the rolled shape.

In forming the battery pack 100, the number of battery cells 110 housed in one battery case 120 is decided depending on a necessary cooling degree in use. For example, if the necessary cooling degree is high, the number of the battery cells 110 housed in one battery case 120 is reduced (e.g., at least one). On the contrary, if the necessary cooling degree is not so high, the number of the battery cells 110 housed in one battery case 120 is increased.

Figure 1:
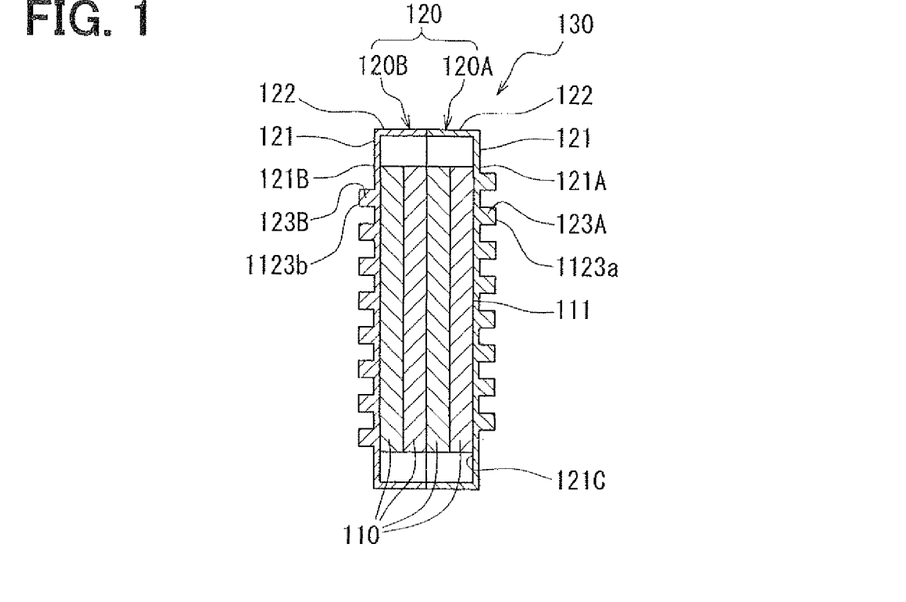
FIG. 1 is a cross-sectional view of a battery module of a battery pack according to a first embodiment of the present invention.

In an example shown in FIGS. 1 and 4, four battery cells 110 are housed in one battery case 120, for example. The four battery cells 110 are stacked in a direction along a thickness direction of each battery cell 110, inside of the battery case 120. That is, the battery cells 110 are stacked in the stacking direction of the battery modules 130, inside of each battery case 120. The battery pack 100 is oriented such that the stacking direction of the battery cells 110 corresponds to a horizontal direction when in use, for example.

As shown in FIG. 1, each of the battery cells 110 has flat main surfaces 111 without having projections or grooves. The battery cells 110 are stacked such that the main surfaces 111 are in contact with each other. An inner surface 121C of the battery case 120 that is opposed to the main surface 111 of the battery cell 110 is a flat surface without having projections and grooves. The main surface 111 of the end battery cell 110 that is located at the end of the stacked battery cells 110 is in contact with the inner surface 121C of the battery case 120. The main surface 111 of the battery cell 110 is perpendicular to the stacking direction. Also, the inner surface 121C of the battery case 120 is perpendicular to the stacking direction.

The battery case 120 includes a first case member 120A and a second case member 120B. The first case member 120A and the second case member 120B have the same shape. Each of the first case member 120A and the second case member 120B is a thin rectangular parallelepiped container with an opening on one side. The first case member 120A and the second case member 120B are coupled such that the openings thereof faces each other, and bonded with each other. Thus, a case inner space for enclosing the battery cells 110 is formed inside of the bonded first and second case members 120A, 120B. That is, the battery case 120 is constructed by joining two case members having the same shape.

The first case member 120A and the second case member 120B are made of a resin material, such as a polypropylene. Each of the first case member 120A and the second case member 120B has a base wall 121 corresponding to a bottom wall of the container, and a peripheral wall 122 extending from an outer end of the base wall 121 and forming the opening. For the purpose of clarity, the base wall 121 of the first case member 120A is referred to as a first base wall 121A, and the base wall 121 of the second case member 120B is referred to as a second base wall 121B.

Figure 2:
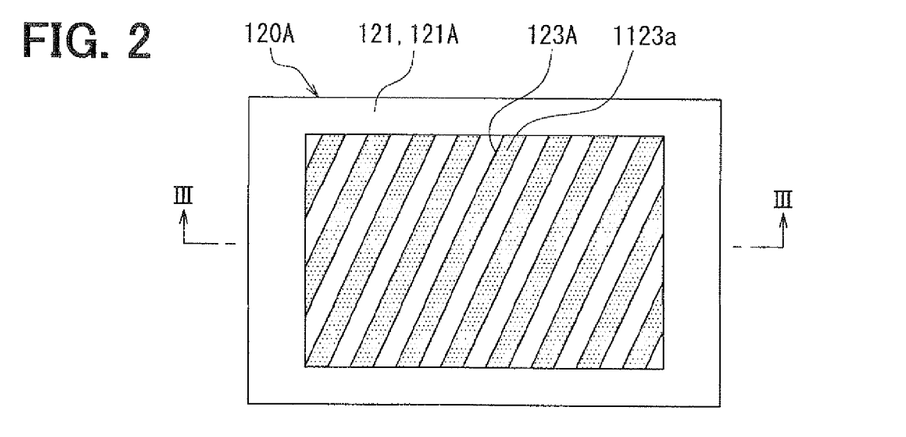
FIG. 2 is a plan view of a battery case of the battery module according to the first embodiment.
Figure 3:
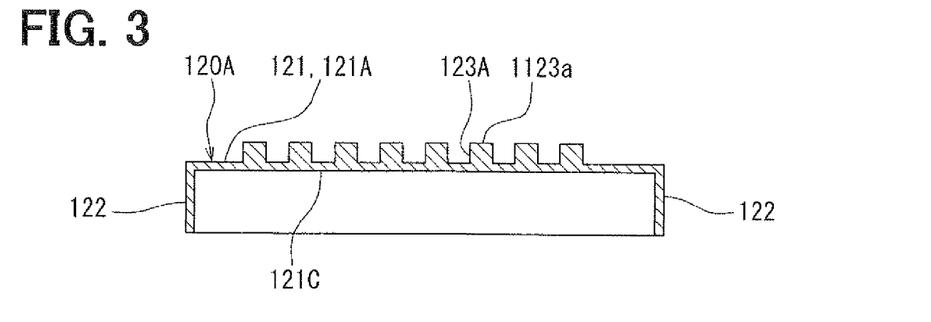
FIG. 3 is a cross-sectional view of a case member of the battery case taken along a line III-III in FIG. 2.
Figure 5:
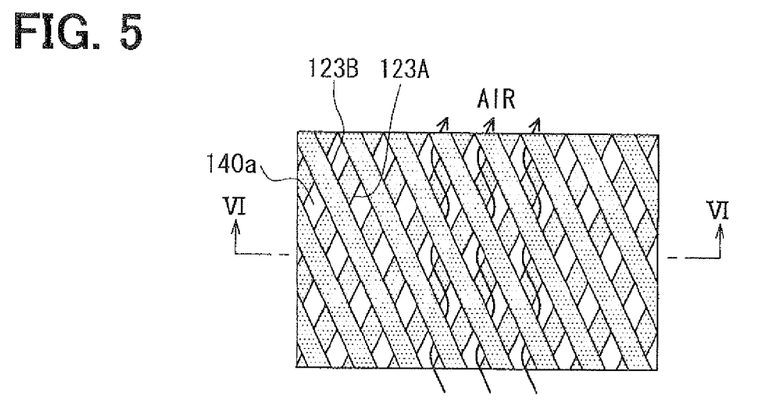
FIG. 5 is a schematic view illustrating a cooling passage structure of the battery module according to the first embodiment.
Figure 6:
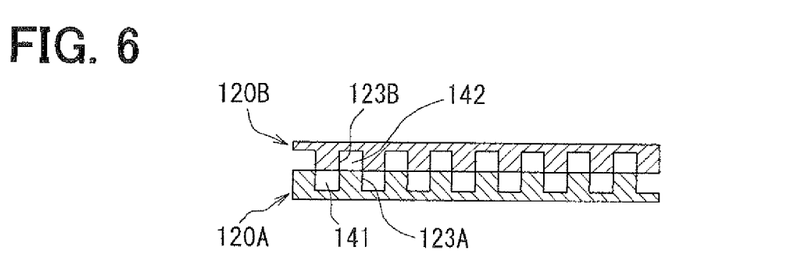
FIG. 6 is a cross-sectional view taken along a line VI-VI in FIG. 5.

The first base wall 121A and the second base wall 121B have a rectangular outline. The first base wall 121A and the second base wall 121B have multiple ribs projecting outward of the battery case 120. In FIGS. 2 and 5, the ribs are hatched for the purpose of clarity. Each of the ribs has a long and narrow shape. The ribs are arranged parallel to each other. For the purpose of clarity, the ribs of the first base wall 121A are referred to as first ribs 123A, and the ribs of the second base wall 121B are referred to as second ribs 123B.

The first ribs 123A and the second ribs 123B have the same shape between the first case member 120A and the second case member 120B. The first ribs 123A are located in an inner area of the first base wall 121A having the rectangular outline.

Likewise, the second ribs 123B are located in an inner area of the second base wall 121B having the rectangular outline.

Each of the first and second ribs 123A, 123B has a rectangular cross-section in a cross-sectional plane defined perpendicular to a longitudinal direction of each rib. Further, each rib 123A, 123B extends in a direction inclined relative to the vertical direction. As shown in FIG. 2, for example, the ribs 123A, 123B extend diagonally right up. An end portion 1123a of the first rib 123A has a flat end surface without having projections and grooves. Likewise, an end portion 1123b of the second rib 123B has a flat end surface without having projections and grooves.

Each of the battery modules 130 is constructed of the battery case 120 and the battery cells 110 housed in the battery case 120, as described hereinabove. The battery modules 130 are stacked in the stacking direction, e.g., the horizontal direction corresponding to the stacking direction of the battery cells 110 within the battery case 120. The stacked battery modules 130 are fixed to each other by being applied with a predetermined binding force (load) from opposite ends thereof with respect to the stacking direction, as shown by arrows in FIG. 4. The battery pack 100 is constructed of the stacked battery modules 130 fixed by the binding force. The battery modules 130 are connected in a manner where the battery cells 110 are electrically connected in series.

The cooling passage 140 is formed between the adjacent battery modules 130 to allow a cooling medium to flow. In the present embodiment, the cooling passage 140 has a following structure.

For example, in the stack of the battery modules 130, the first ribs 123A of any of battery modules 130 (e.g., first battery module 130) project from the first base wall 121A toward the second base wall 121B of an adjacent battery module 130 (e.g., second battery module 130), and the second ribs 123B of the second battery module 130 project toward the first base wall 121A of the first battery module 130.

That is, the cooling passage 140 is formed between opposed surfaces of the adjacent battery cases 120. One of the opposed surfaces has the first ribs 121A projecting toward the other of the opposed surfaces. Also, the other of the opposed surfaces has the second ribs 121B projecting toward the one of the opposed surfaces. The opposed surfaces are provided by the opposed first base wall 121A and second base wall 121B of the adjacent battery cases 120.

The first ribs 123A of the first battery module 130 and the second ribs 123B of the second battery module 130 are opposed to each other with respect to the stacking direction. Since the stacked battery modules 130 is applied with the predetermined binding force in the stacking direction, the end portions 1123a of the first ribs 123A and the end portions 1123b of the second ribs 123B are in contact with each other. That is, the contact portions between the end portions 1123a and the end portions 1123b receive the predetermined binding force, in the adjacent battery cases 120.

The first case member 120A and the second case member 120B have the same shape. Thus, the first ribs 123A and the second ribs 123B have the same diagonally extending shape. When the first case member 120A and the second case member 120B are coupled, one of which is turned or rotated 180 degrees relative to the other. Thus, between the adjacent first and second battery modules 130, the second ribs 123B of the second battery module 130 extend diagonally right down, that is, 180 degrees opposite to the first ribs 123A of the first battery module 130, while the first ribs 123A of the first battery module 130 extend diagonally right up, when viewed along the stacking direction. Therefore, the first ribs 123A and the second ribs 123B are arranged in a diagonally mesh shape intersecting each other, as shown in FIG. 5. Further, the end portions 1123a and the end portions 1123b are in contact with each other at the intersections.

In the first base wall 121A of the first battery module 130, multiple first rib passages 141 are formed between the adjacent first ribs 123A, that is, along the first ribs 123A. In the second base wall 121B of the second battery module 130, multiple second rib passages 142 are formed between the adjacent second ribs 123B, that is, along the second ribs 123B. The cooling passage 140 is provided by the first rib passage 141 and the second rib passages 142, between the adjacent battery modules 130.

In an intersectional area 140a where the first rib passage 141 and the second rib passage 142 intersect with each other, the first rib passage 141 and the second rib passage 142 are in communication with each other. Therefore, the first rib passage 141 can be in communication with another first rib passage 141 through the second rib passages 142. Likewise, the second rib passage 142 can be in communication with another second rib passage 142 through the first rib passages 141. As such, the cooling passage 140 is configured as a mesh-shaped continuous passage, when viewed as a whole.

For example, air flows in the cooling passage 140 as the cooling medium. The air can be naturally introduced into the cooling passage 140. As shown in FIG. 4, the air flows into the cooling passage 140 from a bottom end of the battery pack 100, and flows out from an upper end of the battery pack 100 after flowing through the cooling passage 140. As shown by arrows in FIG. 5, the air flows through the cooling passage 140 in a generally upward direction, for example. It is not always necessary that the air is naturally introduced into the cooling passage 140. Alternatively, a blower can be used to forcibly supply the air into the cooling passage 140.

Next, an operation of the battery pack 100 will be described.

For example, the battery pack 100 is employed as a power supply source for supplying electric power to an object, such as the motor for running a vehicle, an electric device, and the like. When the amount of charge of the battery pack 100 itself is reduced as the result of the power supply, the battery pack 100 can be externally recharged. Thus, the battery pack 100 can continue to supply the electric power. In an operation of the battery pack 100, heat generated from the battery cells 110 is cooled by the air passing through the cooling passage 140.

As described above, since the cooling passage 140 is the mesh-shaped continuous passage, the air flows in a weaving manner as weaving through the mesh. As such, the air can flow in the entirety of the cooling passage 140 in a widely spreading manner. Accordingly, the air can be supplied evenly and entirely over the battery cells 110. As a result, the battery cells 110 can be effectively cooled.

In the intersectional areas 140a where the first rib passages 141 and the second rib passages 142 intersect each other, edges of the end portions 1123a of the first ribs 123A and edges of the end portions 1123b of the second ribs 123B are located. Therefore, the flow of air can be disturbed at the edges of the first and second ribs 123A, 123B. That is, a turbulence effect can be generated by the edges. The forming of the boundary layers is reduced, and the heat transfer coefficient of the air can be improved. Accordingly, the cooling efficiency of the battery cells 110 improves.

The first ribs 123A and the second ribs 123B are inclined relative to an inflow direction (e.g., vertical direction) of the air into the cooling passage 140. Therefore, inside of the cooling passage 140, the air moves while changing directions relative to the inflow direction due to the diagonal first and second ribs 123A, 123B. That is, the air flows in a meandering manner in the cooling passage 140. Accordingly, the air spreads over the entirety of the cooling passage 140.

In fixing the battery modules 130, the predetermined binding force is applied from the opposite ends of the stack of battery modules 130 in the stacking direction. The binding force is received at the contact portions between the end portions 1123a, 1123b of the opposed first and second ribs 123A, 123B. The contact portions between the end portions 1123a, 1123b are evenly distributed over the first and second base walls 121A, 121B. Therefore, the predetermined binding force can be evenly received throughout the first and second base walls 121A, 121B. Further, the binding force is evenly applied over the battery cells 110. Therefore, it is less likely that a dimension of the battery cells 110 in the stacking direction will be uneven. Accordingly, the battery property of the battery cells 110 improves.

The battery case 120 is made of the first case member 120A and the second case member 120B, which are joined to each other with respect to the stacking direction. Therefore, manufacturing costs of the battery pack 100 can be reduced.

If the end portions of the ribs are in directly contact with the battery cell, the battery cells 110 are easily and partially deformed. In the present embodiment, on the other hand, the main surface 111 of the battery cell 110 is in contact with the inner surface 121C of the battery case 120. That is, the battery cells 110 are compressed evenly or overall. Therefore, the evenness of the dimension of the battery cells 110 with respect to the stacking direction improves. Accordingly, the battery property of the battery cells 110 improves.

The shape of the first and second ribs 123A, 123B may be modified in various other ways. FIGS. 7 through 13 illustrate first through fifth modifications of the first and second ribs 123A, 123B. Also in first through fourth modifications, the first case member 120A and the second case member 120B have the same shape, similar to the above-described exemplary embodiment.

Figure 7:
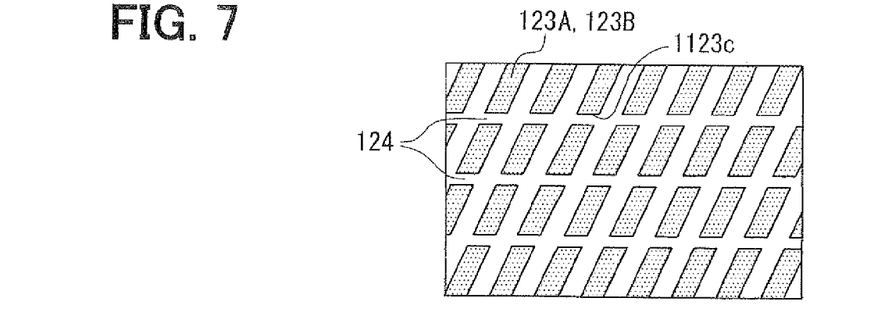
FIG. 7 is a plan view of the battery case for illustrating ribs of a first modification according to the first embodiment.

FIG. 7 is a plan view of the battery case 120 for illustrating the first modification of the first and second ribs 123A, 123B. Also in FIGS. 7 through 13, the ribs 123A, 123B are hatched for the purpose of clarity. As shown in FIG. 7, the first and second ribs 123A, 123B are formed discontinuously in the longitudinal direction (extending direction) thereof. That is, each of the first and second ribs 123A, 123B forms multiple severed portions 124 with respect to the longitudinal direction.

In such a configuration, edges 1123c of each rib 123A, 123B defining the severed portions 124 are located in the cooling passage 140. In addition to the edges of the end portions 1123a, 1123b described above, the disturbance effect can be further improved by the edges 1123c of the ribs 123A, 123B. Therefore, the heat transfer coefficient of the cooling medium can be further improved, and the cooling efficiency of the battery cells 110 can be further improved.

Figure 8:
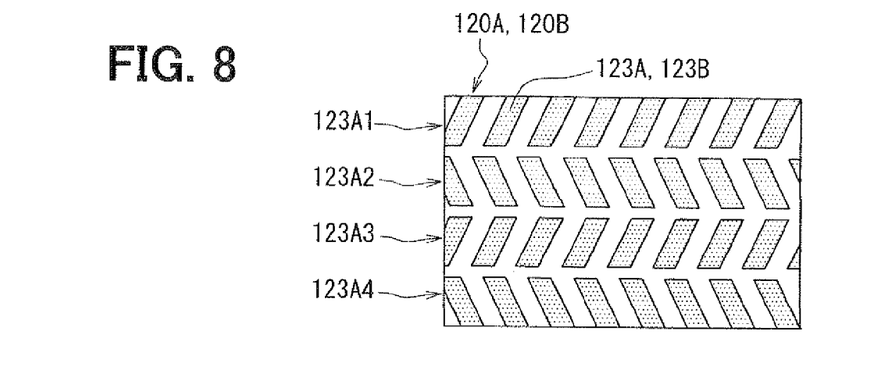
FIG. 8 is a plan view of the battery case for illustrating ribs of a second modification according to the first embodiment.

FIG. 8 is a plan view of the battery case 120 for illustrating the second modification of the first and second ribs 123A, 123B. As shown in FIG. 8, the first case member 120A has multiple rib groups 123A through 123A4 each including a row of the first ribs 123A. Likewise, the second case member 120B has multiple rib groups each including a row of the second ribs 123B. The length of each first rib 123A is shorter than that of the example shown in FIG. 5. Likewise, the length of each second rib 123B is shorter than that of the example shown in FIG. 5. The multiple rib groups 123A1 through 123A4 are arranged in the vertical direction. For example, in each of the rib groups 123A1 through 123A4, the first ribs 123A are aligned in a row in the horizontal direction. Likewise, the second ribs 123B are aligned in a horizontal row in each of the rib groups.

In the first rib group 123A1, the first ribs 123A are arranged diagonally right up, similar to the ribs 123A shown in the example of FIG. 2. In the third rib groups 123A3, the first ribs 123A are arranged diagonally right up, similar to the ribs 123A of the first rib group 123A1. The first ribs 123A of the second rib group 123A2 and the first ribs 123A of the fourth rib group 123A4 are diagonally right down, that is, inclined opposite to the ribs 123A of the first and third rib groups 123A1, 123A3.

That is, in the multiple rib groups 123A1 through 123A4 the first ribs 123A of at least one rib group are arranged in the diagonal direction opposite to the direction of the first ribs 123A of another rib group. In the example of FIG. 8, the first ribs 123A are inclined alternately opposite directions from the first rib group 123A1 to the fourth rib group 123A4. In the second case member 120B, the second ribs 123B are formed in the similar manner to the first ribs 123A of the first case member 120A.

In the second modification, the ribs 123A, 123B are arranged in different diagonal directions relative to the inflow direction of the air into the cooling passage 140 in the multiple rib groups 123A1 through 123A4. In such a configuration, locations to change the flow direction of the cooling air are increased. Therefore, the flow of the air is further complex, and the air can be widely distributed in the entirety of the cooling passage 140. Accordingly, the cooling efficiency of the battery cells 110 further improves.

Figure 9:
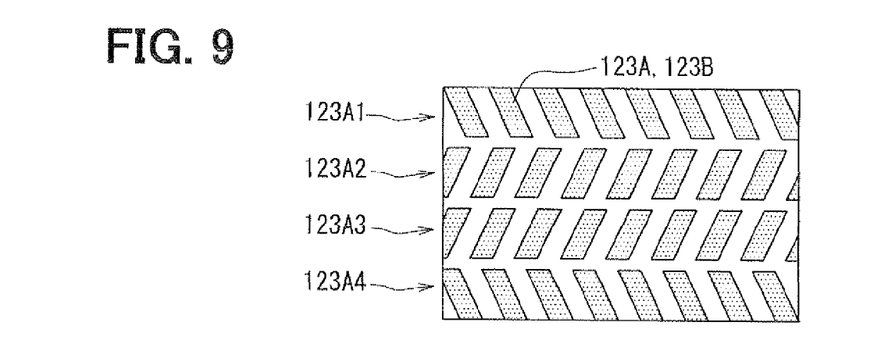
FIG. 9 is a plan view of the battery case for illustrating ribs of a third modification according to the first embodiment.

FIG. 9 is a plan view of the battery case 120 for illustrating the third modification of the first and second ribs 123A, 123B. In the third modification, the first case member 120A has the multiple rib groups 123A1 through 123A4 each including the horizontal row of the first ribs 123A, similar to the second modification, but the direction of inclination of the first ribs 123A is different from that of the second modification. That is, the first ribs 123A of the first rib group 123A1 and the second ribs 123A of the fourth rib group 123A4 are inclined in the same direction. For example, the first ribs 123A of the first and second rib groups 123A1, 123A4 are arranged diagonally right down. On the other hand, the first ribs 123A of the second rib group 123A2 and the first ribs 123A of the third rib group 123A3 are inclined in the same direction, but in the opposite direction as that of the first ribs 123A of the first and fourth rib groups 123A1, 123A4. The second ribs 123B of the second case member 120B can be arranged in the similar manner to the first ribs 123A shown in FIG. 9. In this way, the direction of inclination of the first and second ribs 123A, 123B may be varied randomly between the rig groups 123A1 through 123A4. Also in such a case, the similar advantageous effects can be achieved.

Figure 10:
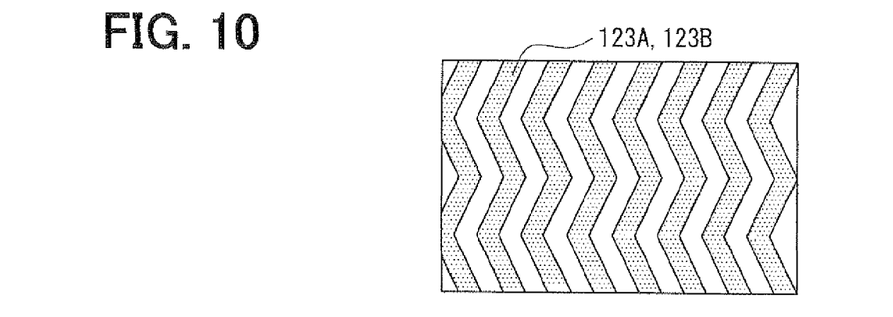
FIG. 10 is a plan view of the battery case for illustrating ribs of a fourth modification according to the first embodiment.

FIG. 10 is a plan view of the battery case 120 for illustrating the fourth modification of the first and second ribs 123A, 123B. As shown in FIG. 10, each of the first ribs 123A and the second ribs 123B has a zigzag shape.

In such a configuration, the locations for changing the flow direction of the air can be increased, similar to the second and third modifications. Therefore, the flow of the air is further complex, and the air can be widely distributed in the entirety of the cooling passage 140. Accordingly, the cooling efficiency of the battery cells 110 further improves.

If the ribs are inclined only in one direction, a stiffness difference may occur. That is, stiffness is high in a direction, while stiffness is low in another direction. In the second through fourth modifications, the first ribs 123A and the second ribs 123B are arranged to extend at least two different directions. That is, each of the first ribs 123A and the second ribs 123B is not arranged to extend only in one direction. Therefore, the stiffness difference is reduced, and thus warp of the first and second cases 120A, 120B can be reduced.

Figure 11:
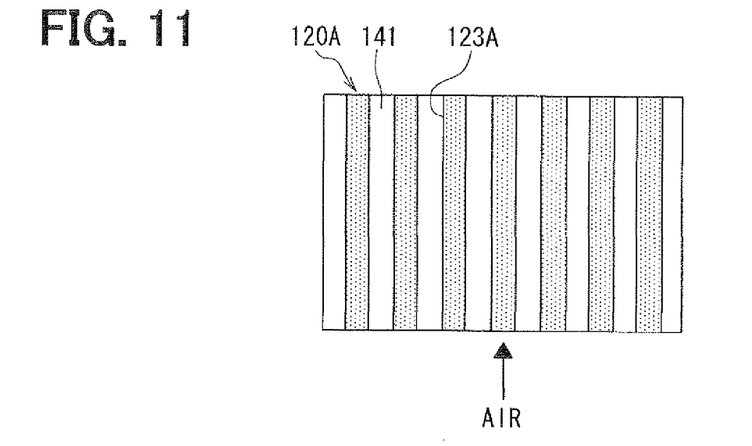
FIG. 11 is a plan view of the battery case for illustrating ribs of a fifth modification according to the first embodiment.
Figure 12:
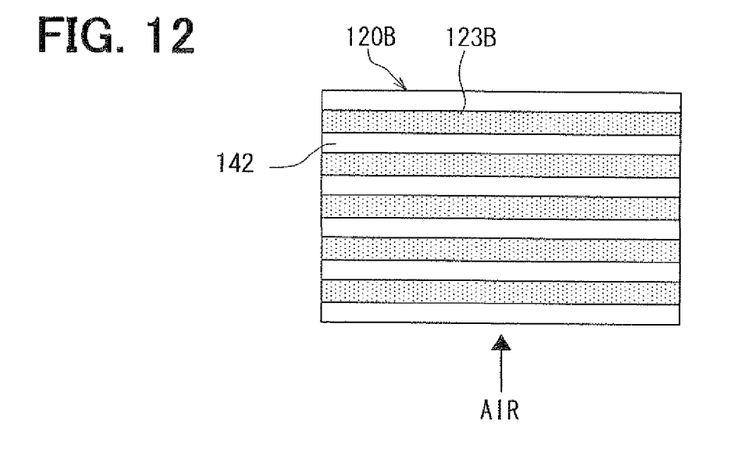
FIG. 12 is a plan view of the battery case for illustrating counterpart ribs of the fifth modification according to the first embodiment.
Figure 13:
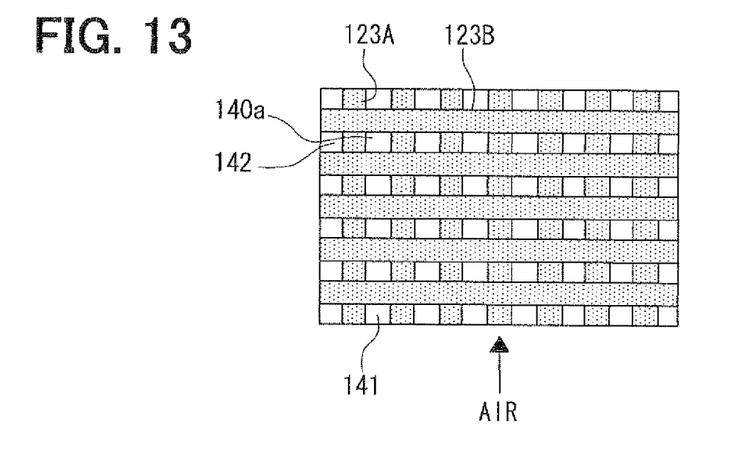
FIG. 13 is a schematic view illustrating a cooling passage structure of the fifth modification according to the first embodiment.

FIG. 11 is a plan view of the first case member 120A for illustrating the first ribs 123A of the fifth modification. FIG. 12 is a plan view of the second case member 120B for illustrating the second ribs 123B of the fifth modification. FIG. 13 is a plan view of a cooling passage structure of the fifth modification. In the fifth modification, the first case member 120A and the second case members 120B have different shapes.

In the first case member 120A, the first ribs 123A extend in the inflow direction of the air into the cooling passage 140, that is, in the vertical direction, as shown in FIG. 11. In the second case member 120B, the second ribs 123B extend in a direction perpendicular to the inflow direction of the air into the cooling passage 140, that is, in the horizontal direction, as shown in FIG. 12. Therefore, when the first case member 120A of any of the battery modules 130 (e.g., the first battery module) is opposed to the second case member 120B of the adjacent battery module 130 (e.g., the second battery module), the first ribs 123A and the second ribs 123B are in contact with each other in the mesh shape. That is, the mesh-shaped cooling passage 140 is formed by the vertical first rib passage portions 141 and the horizontal second rib passage portions 142, as shown in FIG. 13.

In such a configuration, the air flows in the cooling passage 140 while changing the flow direction in at least two different directions by the vertical first ribs 123A and the horizontal second ribs 123B. Therefore, the air can be widely spread over the entirety of the cooling passage 140.

Second Embodiment

Figure 14:
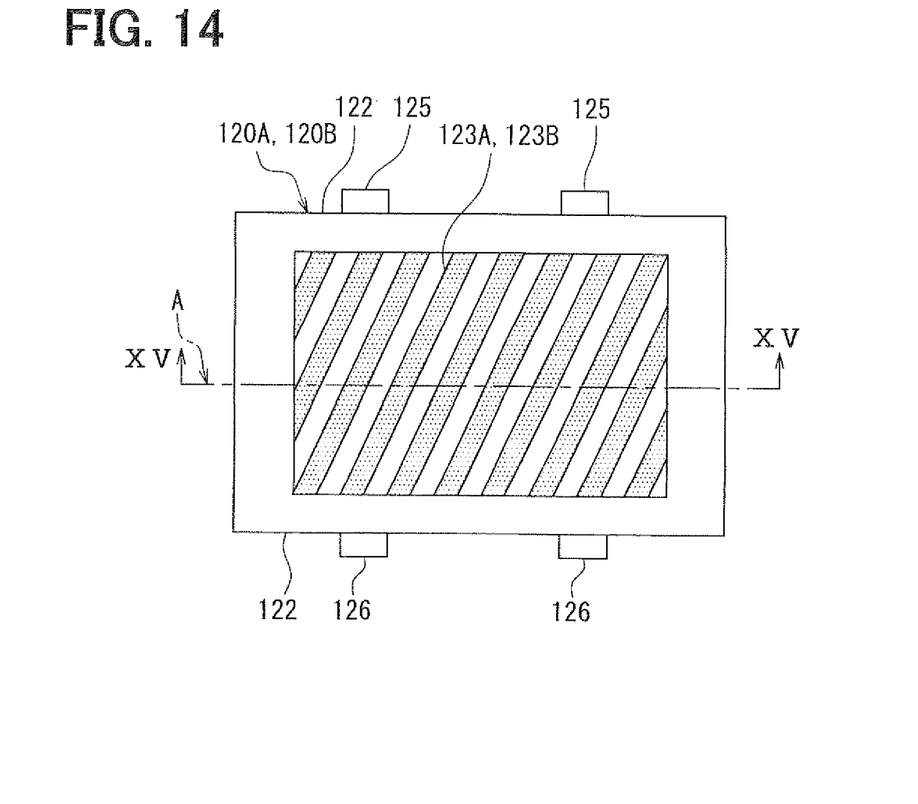
FIG. 14 is a plan view of a battery case of a battery pack according to a second embodiment of the present invention.
Figure 15:
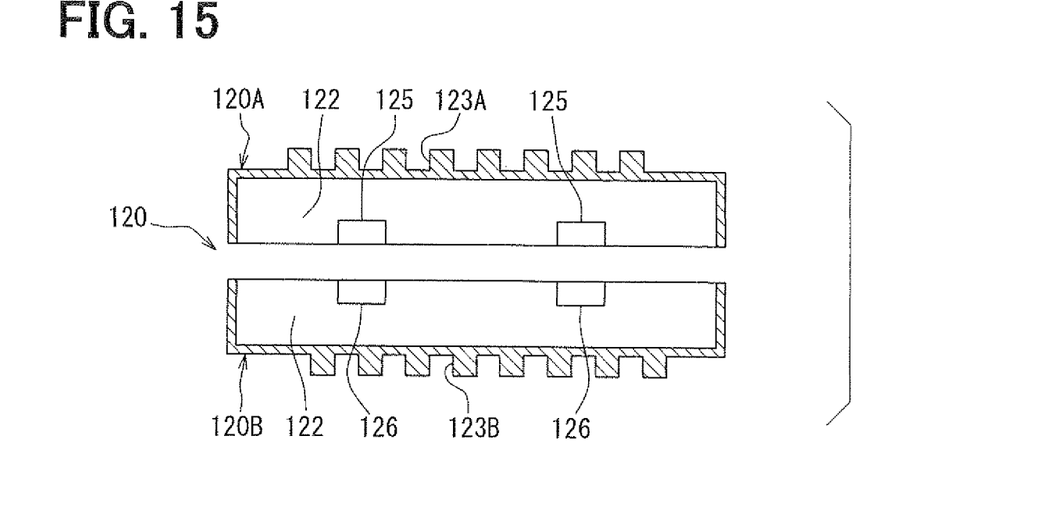
FIG. 15 is a cross-sectional view taken along a line XV-XV in FIG. 14.

A second embodiment will be described with reference to FIGS. 14 and 15. As shown in FIGS. 14 and 15, the first case member 120A and the second case member 120B, which have the same shape, have a male engagement portion 125 and a female engagement portion 126 for fixing in addition to the structure of the first embodiment.

The male engagement portion 125 is a projection that can engage with the female engagement portion 126. The male engagement portion 125 is located on one of four sides of the peripheral wall 122 of each of the first and second case members 120A, 120B. That is, the male engagement portion 125 is located on a first side of the rectangular peripheral wall 122. For example, two male engagement portions 125 are disposed on the first side of the peripheral wall 122. The two male engagement portions 125 are spaced from each other with respect to the longitudinal direction of the first side of the peripheral wall 122, such as, in a right and left direction in FIG. 14.

The female engagement portion 126 is a concave-shaped portion that can engage with the male engagement portion 125. The female engagement portion 126 is located on another one of the four sides of the peripheral wall 122. That is, the female engagement portion 126 is located on a second side of the rectangular peripheral wall 122, the second side being opposite to the first side on which the male engagement portion 125 is located. For example, two female engagement portions 125 are disposed on the second side of the peripheral wall 122 at a predetermined distance apart from each other with respect to the longitudinal direction of the second side of the peripheral wall 122.

The first case member 120A and the second case member 120B have the same shape. When the first case member 120A and the second case member 120B are jointed to each other, one of the first and second case members 120A, 120B is turned relative to the other. Therefore, the male engagement portions 125 and the second engagement portions 126 are disposed at locations symmetric with each other with respect to a turning axis (rotating axis) A of the one.

In fixing the battery module 130, the battery cells 110 are placed in the first case member 120A, and then the second case member 120B are joined to the first case member 120A so that the opening of the second case member 120B faces the opening of the first case member 120A. In such a case, the male engagement portions 125 and the female engagement portions 126 of the first and second case members 120A, 120B are opposed to each other. That is, the male engagement portions 125 of the first case member 120A are engaged with the female engagement portions 126 of the second case member 120B, and the male engagement portions 125 of the second case member 120B are engaged with the female engagement portions 126 of the first case member 120A. In this way, the battery module 130 is formed.

In the present embodiment, the battery case 120 is constructed of the first case member 120A and the second case member 120B having the same shape. That is, the battery case 120 is constructed using two same case members. Therefore, manufacturing costs of the battery pack 100 reduce. After the battery cells 110 are placed in the first case member 120A, the second case member 120B is adjoined to the first case member 120A and the male engagement portions 125 and the female engagement portions 126 of the first and second case members 120A, 120B are engaged with each other. Accordingly, the battery module 130 is easily formed.

Third Embodiment

Figure 16:
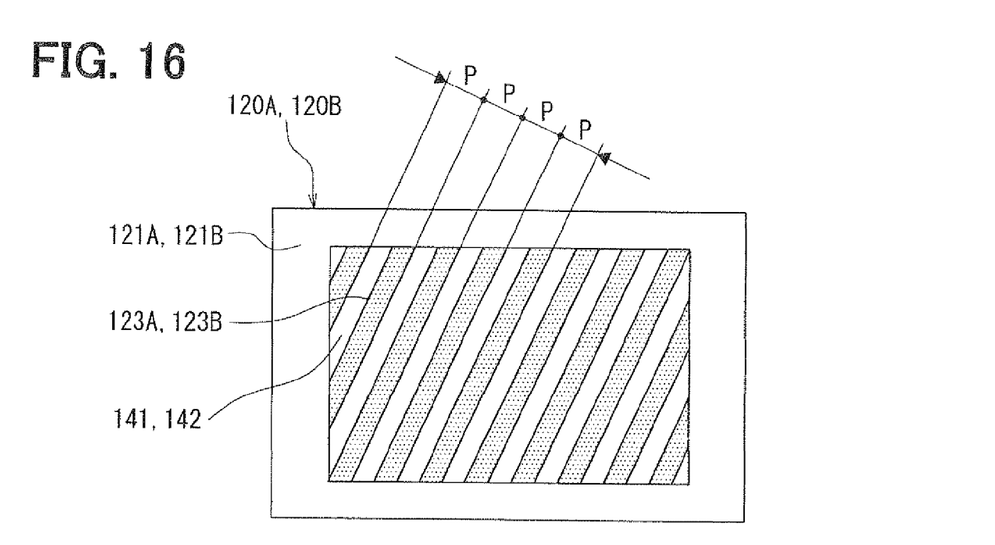
FIG. 16 is a plan view of a battery case of a battery pack for illustrating ribs according to a third embodiment of the present invention.

A third embodiment will be described with reference to FIG. 16. As shown in FIG. 16, the first ribs 123A of the first case member 120A are arranged parallel to each other at an equal pitch (interval) P. Likewise, the second ribs 123B of the second case member 120B are arranged parallel to each other at the equal pitch (interval) P. The first case member 120A and the second case member 120B have the same shape, similar to the first embodiment.

In such a case, the first rib passages 141 have an equal width on the first base wall 121A. Likewise, the second rib passages 142 have an equal width on the second base wall 121B. Thus, the size of the intersectional areas 140a is equal throughout the mesh-shaped cooling passage 140. Therefore, the air can be evenly spread over the entirety of the cooling passage 140, and thus cooling efficiency of the battery cells 110 can be improved.

Since the first and second ribs 123A, 123B are arranged at the same pitch P, the contact portions between the end portions 1123a of the first ribs 123A and the end portions 1123b of the second ribs 123B are equally distributed throughout the first and second base walls 121A, 121B. Therefore, the binding force, which is applied when the battery modules 130a are assembled, can be equally received over the entirety of the first and second base walls 121A, 121B. Further, the binding force is equally applied over the battery cells 110. Therefore, the unevenness of the dimension of the battery cells 110 in the stacking direction is reduced, and the battery property of the battery cells 110 is improved.

Fourth Embodiment

Figure 17:
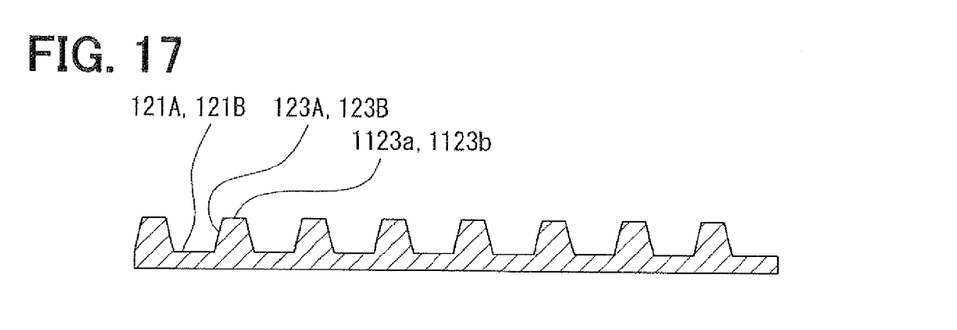
FIG. 17 is a cross-sectional view of ribs of a battery case of a battery pack according to a fourth embodiment of the present invention.

A fourth embodiment will be described with reference to FIG. 17. As shown in FIG. 17, a cross-sectional shape of the first and second ribs 123A, 123B is modified from that of the first embodiment. Each of the first and second ribs 123A, 123B has a trapezoid shape in a cross-section defined perpendicular to the longitudinal direction of the rib 123A, 123B. That is, the width of each rib 123A, 123B reduces from its base portion connecting to the corresponding base wall 121A, 121B toward the end portion 1123a, 1123b.

In such a configuration, when the predetermined binding force is applied to the base portions of the ribs 123A, 123B through the contact portions between the end portions 123a, 123b of the first and second ribs 123A, 123B as a reaction force, the binding force can be transferred to the first and second base walls 121A, 121B while expanding in accordance with the expansion of the width of the first and second ribs 123A, 123B toward the base portions. Therefore, the load can be evenly dispersed over the first and second base walls 121A, 121B.

Since the first and second ribs 123A, 123B are formed to have the trapezoidal cross-sectional shape, it is easy to separate a molding die from the first and second case members 120A, 120B after the first and second case members 120A, 120B are molded with a resin material. As such, a yield ratio improves.

Fifth Embodiment

Figure 18:
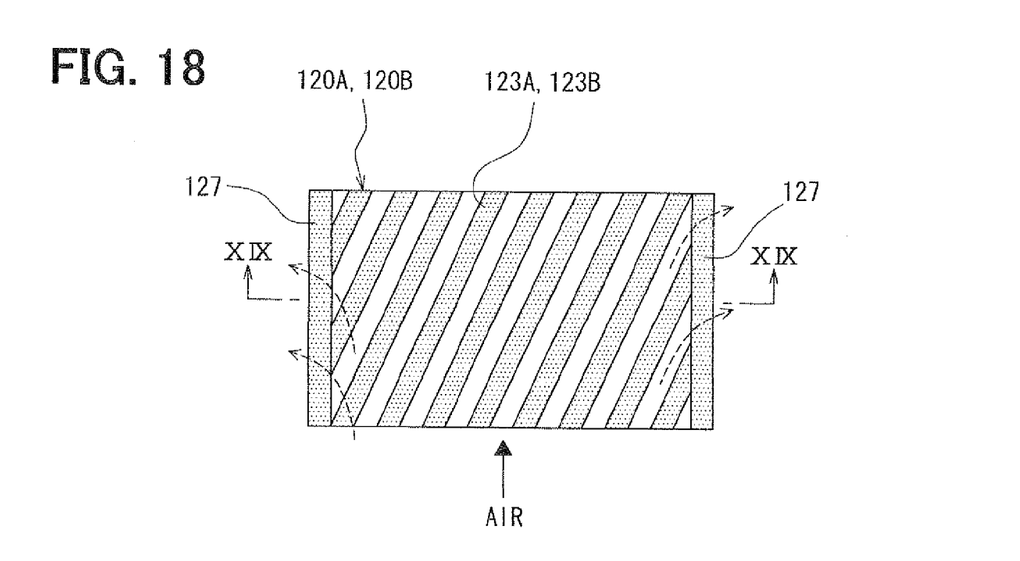
FIG. 18 is a plan view of a wall part of a battery case of a battery pack with wall parts according to a fifth embodiment of the present invention.
Figure 19:
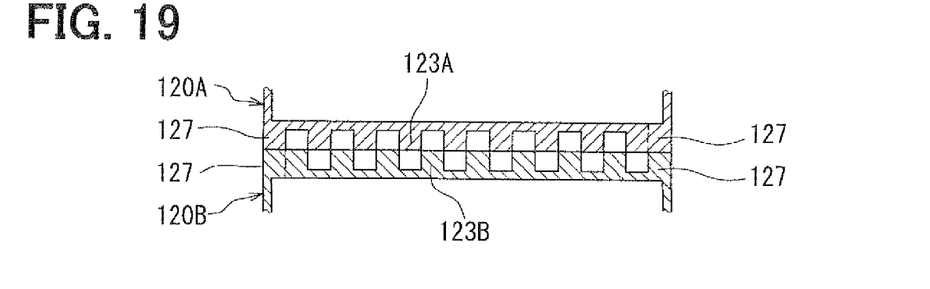
FIG. 19 is a cross-sectional view taken along a line XIX-XIX in FIG. 18.

A fifth embodiment will be described with reference to FIGS. 18 and 19. As shown in FIGS. 18 and 19, in the present embodiment, the first case member 120A and the second case member 120B, which have the identical shape, additionally have wall parts 127.

The wall parts 127 are located at opposite ends of the first and second case members 120A, 120B with respect to the direction perpendicular to the inflow direction of the air into the cooling passage 140. The wall parts 127 project outwardly from the ends of the first and second base walls 121A, 121B, that is, toward the opposed case members 120A, 120B, similar to the first and second ribs 123A, 123B. The wall parts 127 extend straight along the ends of the first and second case members 120A, 120B.

When the battery modules 130 are stacked, that is, the battery cases 120 are stacked in the stacking direction, the wall parts 127 of the first case member 120A of any of the battery modules 130 (e.g., the first battery module) are opposed to the wall parts 127 of the second case member 120B of the adjacent battery module 130 (e.g., the second battery module). In this case, further, ends of the wall parts 127 of the first case member 120A and ends of the wall parts 127 of the second case member 120B are in contact with each other, or located adjacent to each other. Therefore, the ends of the cooling passage 140 are covered with the wall parts 127.

The dimension of the wall parts 127 from the first and second base walls 121A, 121B are equal to or slightly smaller than the dimension of the first and second ribs 123A, 123B from the first and second base walls 121A, 121B with respect to the stacking direction. In a case where the dimension of the wall parts 127 is equal to the dimension of the first and second ribs 123A, 123B, when the predetermined binding force is applied to fix the battery modules 130 in the stacking direction, the first ribs 123A and the second ribs 123B of the adjacent battery cases 120 are brought into contact with each other, and the wall parts 127 of the adjacent battery cases 120 are brought into contact with each other. In this case, therefore, the wall parts 127 receive the binding force, similar to the first and second ribs 123A, 123B. Alternatively, in a case where the dimension of the wall parts 127 is slightly smaller than the dimension of the first and second ribs 123A, 123B, when the predetermined binding force is applied to fix the battery modules 130 in the stacking direction, the first ribs 123A and the second ribs 123B of the adjacent battery cases 120 are brought into contact with each other, while the wall parts 127 do not receive the binding force.

In the above-described configuration, the wall parts 127 restrict the air from leaking from the cooling passage 140, as shown by dashed arrows in FIG. 18. Therefore, the cooling efficiency of the battery cells 110 improves.

Sixth Embodiment

Figure 20:
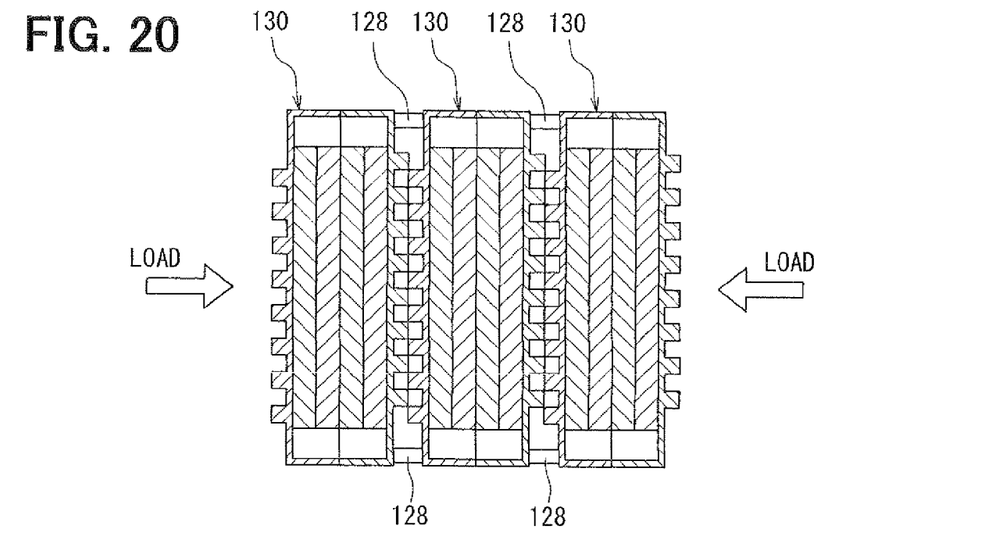
FIG. 20 is a cross-sectional view of a battery pack according to a sixth embodiment of the present invention.
Figure 21:
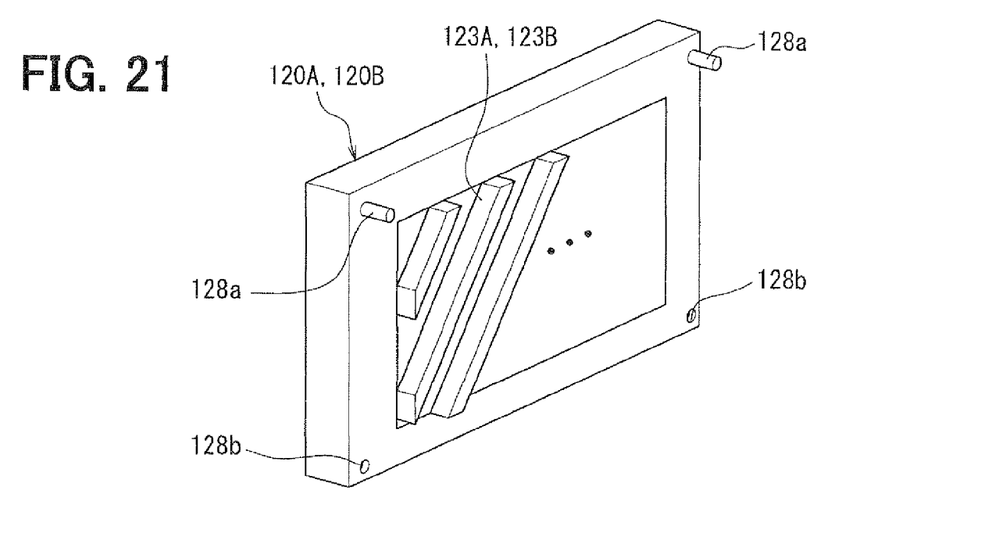
FIG. 21 is a cross-sectional view of a battery case of the battery pack according to the sixth embodiment.

A sixth embodiment will be described with reference to FIGS. 20 and 21. As shown in FIGS. 20 and 21, the first case member 120A and the second case member 120B, which have the identical shape, additionally have coupling parts 128. The coupling parts 128 are provided to properly position and couple the battery modules 130 when the battery modules 130 are stacked.

The coupling parts 128 are provided by cylindrical pins 128a and circular holes 128b. The pins 128a are located at the upper corners of the first and second case members 120A, 120B to project in the stacking direction. The holes 128b are located at the lower corners of the first and second case members 120A, 120B. The outer dimension (e.g., diameter) of the pins 128a is slightly smaller than the inner dimension (e.g., diameter) of the holes 128b.

When the first case member 120A is coupled to the second case member 120B to form the battery module 130, one of the first case member 120A and the second case member 120B (e.g., the second case member 120B) is turned or rotated relative to the other. Thus, in the first case member 120A, the pins 128a are located at the upper corners of the first case member 120A, and the holes 128b are located at the lower corners of the first case member 120A. On the contrary, in the second case member 120B, which has been rotated, the holes 128b are located at the upper corners of the second case member 120B, and the pins 128a are located at the lower corners of the second case member 120A.

Therefore, when the battery modules 130 are stacked, the pins 128a of the first battery module 130 are opposed to the holes 128b of the adjacent battery module 130. Also, the holes 128b of the first battery module 130 are opposed to the pins 128a of the adjacent battery module 130. The pins 128a are received in the opposed holes 128b.

Therefore, when the battery modules 130 are stacked, the position of the battery modules 130 is regulated, and the battery modules 130 are coupled to each other. Further, the predetermined binding force is applied from the opposite ends of the stacked battery modules 130 in the stacking direction. As such, the battery modules 130 are fixed.

In the present embodiment, the battery modules 130 are stacked while regulating the positions thereof through the coupling parts 128. Therefore, assemblability improves.

The coupling pins 128 may be modified in the following manner. Also in the following cases, the similar advantageous effect can be achieved.

For example, the outer dimension of the pins 128a may be slightly larger than the inner dimension of the holes 128b. In this case, the pins 128a are fitted in the holes 128b in a pressed manner when the battery modules 130 are coupled to each other while regulating the positions thereof.

As another example, the outer dimension of the ends of the pins 128a may be slightly larger than the inner dimension of the holes 128b. In this case, when the pins 128a are inserted in the holes 128b, the ends of the pins 128a, that is, the larger-diameter portions of the pins 128a are elastically deformed. Further, when the pins 128a are inserted into the holes 128b by the amount corresponding to the thickness of the first and second case members 120A, 120B, the elastically deformed portions are restored inside of the holes 128b. In this way, the pins 128a can be engaged with the holes 128b. As further another example, the coupling parts 128 may be provided by engagement projections and engagement recesses. The engagement projections and the engagement recesses may be fitted with each other after being engaged.

Various exemplary embodiments of the present invention are described hereinabove. However, the present invention is not limited to the abode described exemplary embodiments, but may be implemented in various other ways without departing from the spirit of the invention. Further, the present invention may be implemented by combining the whole of or some structures of the above described exemplary embodiments in various ways.

In the above-described embodiments, all the first ribs 123A and all the second ribs 123B cross each other, for example, as shown in FIG. 5. However, it is not always necessary to intersect all the first ribs 123A and all the second ribs 123B each other. For example, some of the first ribs 123A and/or some of the second ribs 123B may not cross each other. For example, at an inlet area and an outlet area of the cooling passage 140, the first ribs 123A and the second ribs 123B may be formed to extend in the inflow direction of the air so that the first rib passages 141 and the second rib passages 142 extend in the same direction. In such a case, pressure loss at the inlet area and the outlet area of the cooling passage 140 can be reduced.

In the above-described embodiments, the air flows through the cooling passage 140 generally in the upward direction, and thus the inflow direction corresponds to the vertically upward direction. However, the flow direction of the air is not limited to the generally upward direction. For example, the air may flow in the cooling passage 140 in the generally horizontal direction. In such a case, the wall parts 127 of the fifth embodiment are disposed at the upper ends and the lower ends of the first and second case members 120A, 120B to extend straight in the horizontal direction.

The cooling medium is not limited to the air, but may be cooling liquid or the like. In such a case, the battery pack 100 is encased in a housing, and the cooling passages 140 are formed between the battery modules 130 within the housing.

In some of the above-described embodiments, the battery case 120 is constructed by coupling two case members 120A, 120B having the identical shape. However, it is not always necessary that the battery case 120 is constructed by coupling two case members having the identical shape as long as the mesh-shaped continuous cooling passage 140 is formed by the ribs between opposed surfaces of the adjacent battery cases 120.

Additional advantages and modifications will readily occur to those skilled in the art. The invention in its broader term is therefore not limited to the specific details, representative apparatus, and illustrative examples shown and described.

What is claimed is:

1. A battery pack comprising a plurality of battery modules each including a battery cell and a battery case housing the battery cell therein, the plurality of battery modules being electrically connected to each other and stacked in a stacking direction so that a cooling passage for allowing a cooling medium to flow is defined between opposed surfaces of adjacent battery cases, wherein one of the opposed surfaces has a plurality of first ribs projecting toward the other of the opposed surfaces and extending parallel to each other along the one of the opposed surfaces, the other of the opposed surfaces has a plurality of second ribs projecting toward the one of the opposed surfaces and extending parallel to each other along the other of the opposed surfaces, the plurality of first ribs and the plurality of second ribs are integrally formed with the battery cases, the first ribs and the second ribs intersect each other when viewed in a direction along the stacking direction, and end portions of the first ribs and end portions of the second ribs are directly in contact with each other at intersected portions with respect to the stacking direction, the cooling passage is provided by first rib passages defined between the first ribs and second rib passages defined between the second ribs, adjacent first rib passages are in communication with each other through at least one of the second rib passages, adjacent second rib passages are in communication with each other through at least one of the first rib passages, the cooling passage is in a shape of a mesh, each of the first ribs and the second ribs has a continuous zigzag shape along the opposed surfaces when viewed in the direction along the stacking direction, the plurality of battery modules are fixed to each other by applying a predetermined load in the stacking direction, and between the adjacent battery cases, the predetermined load is received at contact portions between the end portions of the first ribs and the end portions of the second ribs.

2. The battery pack according to claim 1, wherein the first ribs extend in a direction inclined relative to an inflow direction of the cooling medium into the cooling passage, and the second ribs extend in a direction inclined relative to the inflow direction of the cooling medium.

3. The battery pack according to claim 1, wherein the battery case includes a first case member and a second case member having an identical shape, the first case member and the second case member being coupled to each other in the stacking direction, each of the first case member and the second case member has a male engagement portion and a female engagement portion, the male engagement portion being located on a first side of a peripheral portion of the corresponding case member, the female engagement portion being located on a second side of the peripheral portion of the corresponding case member, the second side being opposite to the first side, the first case member and the second case member are coupled to each other so that the male engagement portion of the first case member is engaged with the female engagement portion of the second case member, and the female engagement portion of the first case member is engaged with the male engagement portion of the second case member.

4. The battery pack according to claim 1, wherein the first ribs and the second ribs are arranged at an equal pitch.

5. The battery pack according to claim 1, wherein
the adjacent battery cases have wall parts at opposite ends of the opposed surfaces with respect to a direction perpendicular to an inflow direction of the cooling medium into the cooling passage, and the wall parts covers ends of the cooling passage between the adjacent battery cases.

6. The battery pack according to claim 1, wherein
the battery case has a coupling part for positioning the battery modules relative to each other and coupling the battery modules when the battery modules are stacked.

7. The battery pack according to claim 1, wherein
the battery modules are fixed to each other by applying a predetermined load in the stacking direction, and
a surface of the battery cell is in contact with an inner surface of the battery case, the surface of the battery cell and the inner surface of the battery case being perpendicular to the stacking direction.

8. The battery pack according to claim 1, wherein
the first ribs and the second ribs have uniform height, and the end portions thereof have flat surfaces.

9. The battery pack according to claim 1, wherein
the first ribs and the second ribs have uniform height,
each of the first ribs and the second ribs has a constant height over the opposed surface, and the end portion thereof has a flat surface, and
each of the first ribs and the second ribs extends continuously with a constant width over the opposed surface.

10. The battery pack according to claim 1, wherein
the first ribs and the second ribs have uniform height,
each of the first ribs and the second ribs has a constant height over the opposed surface, and the end portion thereof has a flat surface,
each of the first ribs and the second ribs extends continuously with a constant width over the opposed surface,
the battery case includes a first case member and a second case member having an identical shape, the first case member and the second case member being coupled to each other in the stacking direction, and
a surface of the battery cell is in contact with an inner surface of the battery case, the surface of the battery cell and the inner surface of the battery case being perpendicular to the stacking direction.

* * * * *